United States Patent
Soo et al.

(10) Patent No.: US 9,475,487 B2
(45) Date of Patent: Oct. 25, 2016

(54) TEMPORARY ENGINE START OR STOP USING PADDLE SHIFTER

(71) Applicant: FORD GLOBAL TECHNOLOGIES, LLC, Dearborn, MI (US)

(72) Inventors: Brian Thomas Soo, Farmington Hills, MI (US); Bernard D. Nefcy, Novi, MI (US); David Paul Tourner, Novi, MI (US); Charles Vitullo, Allen Park, MI (US); Craig Edward Esler, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/340,649

(22) Filed: Jul. 25, 2014

(65) Prior Publication Data
US 2016/0023652 A1   Jan. 28, 2016

(51) Int. Cl.
*F02N 11/08* (2006.01)
*B60W 20/00* (2016.01)

(52) U.S. Cl.
CPC ........... *B60W 20/20* (2013.01); *F02N 11/0822* (2013.01); *Y02T 10/6286* (2013.01); *Y10S 903/902* (2013.01)

(58) Field of Classification Search
CPC .............. B60W 20/20; F02N 11/0822; Y10S 903/902
USPC .......................................................... 701/22
See application file for complete search history.

(56) References Cited

U.S. PATENT DOCUMENTS

| 8,485,941 | B2 | 7/2013 | Beechie et al. | |
| 2010/0102945 | A1* | 4/2010 | Watson | B60K 35/00 340/462 |
| 2013/0066494 | A1* | 3/2013 | Kamijo | F02N 11/0844 701/22 |
| 2013/0090798 | A1* | 4/2013 | Fukushiro | B60K 6/445 701/22 |
| 2013/0184915 | A1* | 7/2013 | Boskovitch | B60W 20/00 701/22 |
| 2014/0005866 | A1 | 1/2014 | Kuang et al. | |
| 2014/0081561 | A1 | 3/2014 | Be et al. | |

OTHER PUBLICATIONS

Chevrolet News—United States—Volt, May 5, 2014, http://media.gm.com/media/us/en/chevrolet/vehicles/volt/2013.html, 5 pages.
Silverado Hybrid . . . Emergency Power, Hendon Media Group, Law Enforcement Publications and Conferences, Hendon Publishing—Article Archive Details, May 5, 2014, five pages.

* cited by examiner

*Primary Examiner* — Rodney Butler
*Assistant Examiner* — Frederick Brushaber
(74) *Attorney, Agent, or Firm* — David B. Kelly; Brooks Kushman P.C.

(57) ABSTRACT

A vehicle includes an internal combustion engine, a driver interface having a first driver-activated selector, and a controller. The controller selectively operates the engine according to a first mode and a second mode. In the first mode the engine runs continuously. In the second mode the engine is turned off in response to a first set of operating conditions and turned on in response to a second set of operating conditions. The controller further, in response to a driver activation of the first selector, controls the engine according to the first mode and, in response to an anticipated end of a first vehicle acceleration event subsequent the driver activation of the first selector, controls the engine according to the second mode.

11 Claims, 2 Drawing Sheets

TEMPORARY ENGINE START OR STOP USING PADDLE SHIFTER

TECHNICAL FIELD

The present disclosure relates to controlling an internal combustion engine in a hybrid vehicle.

BACKGROUND

Hybrid electric vehicles include both engines and traction motors. One method of improving the fuel economy in an HEV is to shut down the engine during times that the engine operates inefficiently, and is not otherwise needed to propel the vehicle. In these situations, the electric motor is used in an electric drive mode to provide all of the power needed to propel the vehicle. The HEV is provided with control logic configured to turn the engine on or off according to various operating conditions.

SUMMARY

A vehicle according to the present disclosure includes an internal combustion engine, a driver interface having a first driver-activated selector, and a controller. The controller is configured to selectively operate the engine according to a first mode and a second mode. In the first mode the engine runs continuously. In the second mode the engine is turned off in response to a first set of operating conditions and turned on in response to a second set of operating conditions. The controller is further configured to, in response to a driver activation of the first selector, control the engine according to the first mode and, in response to an anticipated end of a first vehicle acceleration event subsequent the driver activation of the first selector, control the engine according to the second mode.

In some embodiments, the driver interface further includes a second driver-activated selector and the controller is further configured to selectively control the engine according to a third mode. In the third mode, the engine is off continuously. In response to a driver activation of the second selector, the controller controls the engine according to the third mode and, in response to an anticipated first vehicle acceleration event following the driver activation of the second selector, the controller controls the engine according to the first mode. The driver interface may be a vehicle steering wheel and the first driver-activated selector may be a paddle. In some embodiments, the anticipated end of a first vehicle acceleration event is anticipated in response to a negative change in vehicle acceleration, where vehicle acceleration is defined relative to a forward direction. The negative change in vehicle acceleration may last for a duration exceeding a predefined time interval. The anticipated end of the first vehicle acceleration event may be based on a change in position of the accelerator pedal or the brake pedal. Some embodiments additionally include a display that is configured to signal to a driver that the engine is being operated according to the second mode, wherein the controller is further configured to activate the display while controlling the engine according to the second mode. Some embodiments include a display configured to signal to a driver that control according to the second mode is unavailable, wherein the controller is further configured to activate the display and inhibit operating the engine according to the second mode in response to a third set of operating conditions.

A method of controlling a vehicle, the vehicle including an engine equipped with automatic stop and start functions, includes starting the engine in response to a first driver input, the engine being off, and the automatic start function being available. The method additionally includes inhibiting the automatic stop function in response to the first driver input. The method further includes ceasing the inhibition of the automatic stop function in response to a first decrease in vehicle acceleration subsequent the driver input.

Some embodiments further include ceasing the inhibition of the automatic stop function in response to a predetermined time elapsing following the driver input. Some embodiments additionally include, in response to the first driver input, the engine being off, and the automatic start function being unavailable, displaying an alert to a driver indicating that the engine may not be started. The first decrease in vehicle acceleration following the first driver input may correspond to a driver release of an accelerator pedal or actuation of a brake pedal. One embodiment includes automatically stopping the engine in response to a second driver input, the engine being on, and the automatic stop function being available. Such an embodiment further includes inhibiting the automatic start function in response to the second driver input, and ceasing the inhibition of the automatic stop function in response to a first increase in vehicle acceleration subsequent the second driver input. Such an embodiment may also include, in response to the second driver input, the engine being on, and the automatic stop function being unavailable, displaying an alert to a driver indicating that the engine may not be stopped. The first increase in vehicle acceleration following the second driver input may correspond to a driver release of a brake pedal or actuation of an accelerator pedal.

A vehicle according to the present disclosure includes an engine and a controller. The engine is configured to automatically stop in response to a first set of operating conditions and automatically start in response in response to a second set of operating conditions. The controller is configured to, in response to a first driver input, the engine being on, and an operating condition not being satisfied, automatically stop the engine and maintain the engine in a stopped condition until a first increase in vehicle acceleration following the first driver input. The operating condition corresponds to an engine running requirement.

In some embodiments, the controller is further configured to, in response to a second driver input and the engine being off, automatically start the engine and maintain the engine in a running condition until a first decrease in vehicle acceleration following the second driver input. The first decrease in acceleration may correspond to a driver release of an accelerator pedal or a driver actuation of a brake pedal, and the first increase in acceleration may correspond to a driver release of a brake pedal or a driver actuation of an accelerator pedal. In some embodiments, the vehicle additionally includes a display configured to signal to a driver that the engine may not be stopped. In such an embodiment, the controller is further configured to activate the display in response to the first driver input and the operating condition being satisfied.

Embodiments according to the present disclosure provide a number of advantages. For example, the present disclosure provides a system and method whereby a driver may ensure that the internal combustion engine will be on to provide torque to vehicle traction wheels when desired. In addition, systems and methods according to the present disclosure enable a driver to turn off the engine in driving situations where it is desirable to turn the engine off in deviation from a nominal engine control logic. Furthermore, systems according to the present disclosure are configured to automatically return to a nominal hybrid control mode in response to the end of the acceleration or deceleration event.

The above and other advantages and features of the present disclosure will be apparent from the following detailed description of the preferred embodiments when taken in connection with the accompanying drawings.

DETAILED DESCRIPTION

Figure 1:
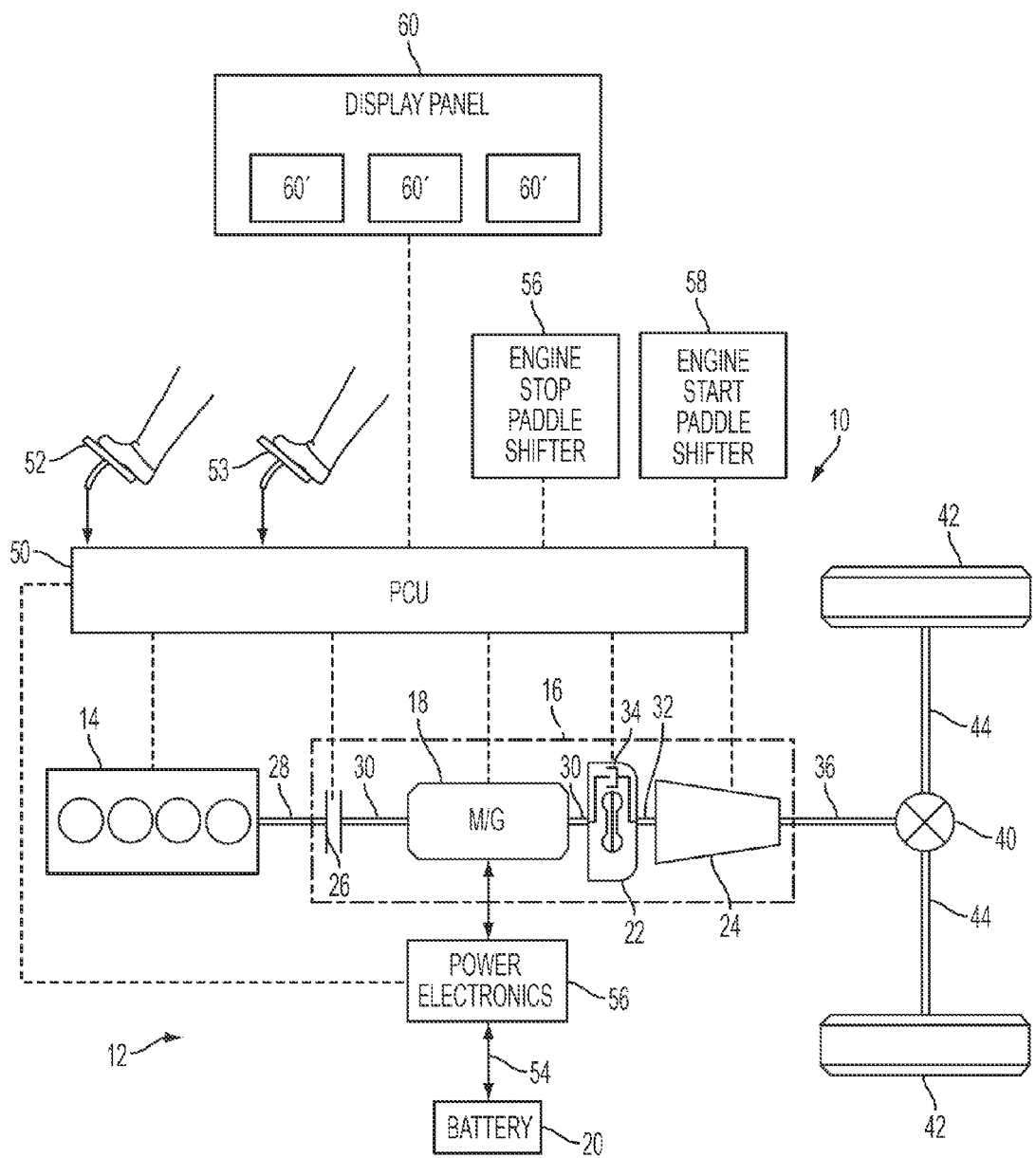
FIG. 1 is a schematic illustration of a hybrid electric vehicle having engine stop and start control paddle shifters.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid vehicles are provided with a nominal control logic that selectively controls the vehicle according to various modes of operation. A controller may control the vehicle according to a hybrid mode, in which both an engine and a motor provide torque to vehicle wheels, in response to a first set of operating conditions. The controller may control the vehicle according to an electric mode, in which the engine is turned off and only a motor provides torque, in response to a second set of operating conditions. The operating conditions may include, but are not limited to, a state of charge of a traction battery, a driver torque demand transmitted by an accelerator pedal, and power drawn by various accessories and the vehicle HVAC system.

In some driving situations, a driver may anticipate a desire for the engine to be running even though the nominal control logic dictates control according to the electric mode. As an example, when the vehicle comes to a stop, the engine is generally stopped and the motor is at zero speed. If the driver lightly tips into, or actuates, the accelerator pedal, the vehicle is typically propelled from a stop using only the motor to provide torque, i.e. the controller controls the vehicle according to the electric mode. As torque from the motor is quickly delivered to the vehicle wheels, there is only a minimal delay between the driver torque demand and torque transmission to the wheels. However, when the vehicle is at rest and the driver does a heavy tip-in, the driver torque demand may exceed a torque quantity the motor is capable of supplying, necessitating an engine start. The engine start time may introduce a delay between the driver torque demand and transmission of engine torque to the vehicle wheels. As another example, the vehicle may be driving in electric mode and the driver desires to pre-position the engine to be on for a known future event demanding power. Similarly, the driver may anticipate a desire for the engine to be stopped even though the nominal control logic dictates control according to the hybrid mode.

Referring now to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged. When the disconnect clutch 26 is engaged, a fixed speed relationship exists between the speed of the engine 14 and the speed of the M/G 18.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36. The gearbox 24 may be understood to provide a selectable fixed speed relationship between the speed of M/G 18 and the speed of vehicle traction wheels 42.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example.

A brake pedal 53 is used by the driver of the vehicle to provide a demand for braking or negative torque to slow the vehicle. In general, depressing and releasing the brake pedal 53 generates a brake pedal position signal that may be interpreted by the controller 50 as a demand for increased braking or decreased braking, respectively. Based at least upon input from the pedal, the controller 50 commands braking torque from vehicle brakes (not illustrated). The vehicle brakes generally include friction brakes. The M/G 18 may additionally act as a generator to provide regenerative braking, in which rotational energy from spinning wheels 42 is transferred back through the gearbox 24 and is converted into electrical energy for storage in the battery 20.

The vehicle 10 includes an engine stop paddle shifter 56 and an engine start paddle shifter 58. In a preferred embodiment, the paddle shifters 56 and 58 are arranged on a vehicle steering wheel. In other embodiments, the paddle shifters 56 and 58 may be physical or virtual buttons on a dashboard or other appropriate inputs. The paddle shifters 56 and 58 are in communication with the controller 50. The controller 50 is configured to stop the engine 14 in response to a driver activation of the engine stop paddle shifter 56 and to start the engine 14 in response to a driver activation of the engine start paddle shifter 58, as will be discussed in further detail below.

The vehicle 10 additionally includes a display panel 60 including a plurality of display elements 60'. In one embodiment, the display panel 60 is a multi-function digital display, and the display elements 60' are icons that are selectively shown on the display 60. In another embodiment, the display elements 60' are warning lights that are selectively illuminated in a vehicle dashboard display.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
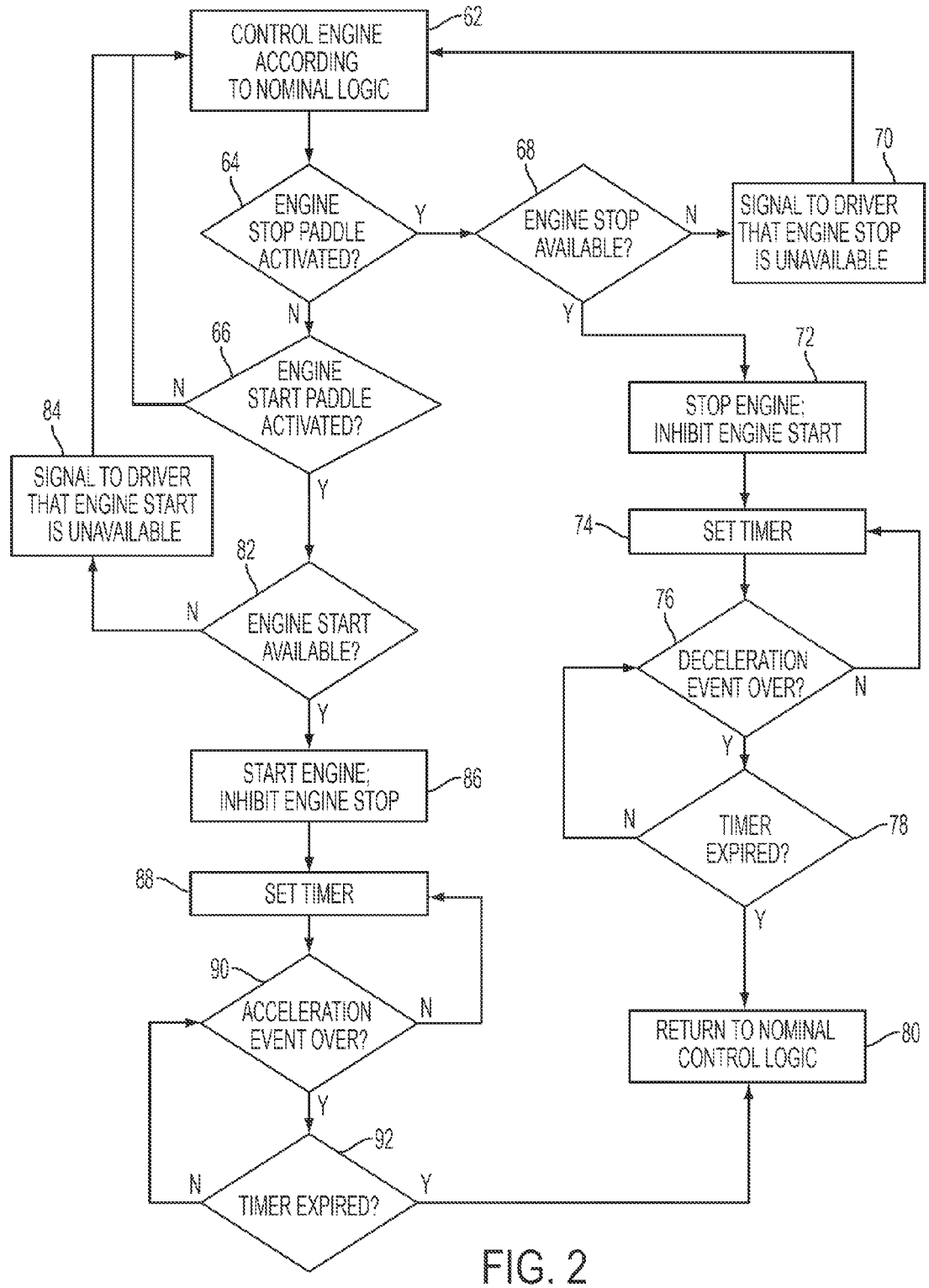
FIG. 2 illustrates a method of controlling an engine in a hybrid electric vehicle having stop and start control paddle shifters.

Referring now to FIG. 2, a method of controlling a vehicle is illustrated in flowchart form. The method begins with the engine controlled according to nominal hybrid logic, as illustrated at block 62. In this mode, the engine may be turned off in response to a first set of operating conditions and turned on in response to a second set of operating conditions. A determination is then made of whether an engine stop paddle has been activated, as illustrated at operation 64. A driver may activate the engine stop paddle in anticipation of a vehicle deceleration event, for example. If no, then a determination is made of whether an engine start paddle has been activated, as illustrated at operation 66. A driver may activate the engine start paddle in anticipation of a vehicle acceleration event, for example. If no, then the algorithm returns to block 62 and the engine is controlled according to the nominal hybrid logic. Thus, the vehicle is controlled according to nominal hybrid operation unless and until one of the paddles is activated.

Returning to operation 64, if a determination is made that the engine stop paddle was activated, then a determination is made of whether the engine stop function is available, as illustrated at operation 68. Under certain driving conditions, the engine may be required to run continuously and thus the engine stop function may not be used. For example, if a battery state of charge is below a threshold, the engine may be required to run and recharge the battery. As another example, if a vehicle accessory or HVAC load is too high, the engine may be required to run. If a determination is made at operation 68 that the engine stop function is not available, then an alert is signaled to the driver indicating that the engine stop function is unavailable, as illustrated at block 70. Control then returns to block 62 and the engine is controlled according to the nominal hybrid logic.

If a determination is made at operation 68 that the engine stop function is available, then the engine is stopped and the engine start function is inhibited, as illustrated at block 72. A delay timer is then set, as illustrated at block 74. The delay is a calibratable value that may be, for example, between 0.5 seconds and 1 second. A determination is then made of whether a vehicle deceleration event has ended, as illustrated at operation 76. The end of the deceleration event may be inferred in response to a driver release of a brake pedal, a driver actuation of an accelerator pedal, or based on other appropriate inputs. Generally speaking, the end of the deceleration event is indicative that the driver has completed the driving segment for which it was desired to keep the engine stopped. If the deceleration event is not over, then the timer is reset at block 74. If the deceleration event is over, then a determination is made of whether the timer has expired, as illustrated at operation 78. If no, control returns to operation 76. In this fashion, the timer acts as a delay to monitor the vehicle acceleration over a calibrated time period and ensure that the deceleration event has ended. Premature vehicle starts caused by transient acceleration changes may thus be avoided. If the timer has expired, then the engine is controlled according the nominal control logic, as illustrated at block 80. The inhibition of the engine start function is thus ceased.

Returning to operation 66, if a determination is made that the engine start paddle was activated, then a determination is made of whether the engine start function is available, as illustrated at operation 82. Under certain driving conditions, the engine may be required to remain off and thus the engine start function may not be used. For example, if the vehicle is located within a predefined electric-only zone, the vehicle may be required to continue operation with the engine off. If a determination is made at operation 82 that the engine start function is not available, then an alert is signaled to the driver indicating that the engine start function is unavailable, as illustrated at block 84. Control then returns to block 62 and the engine is controlled according to the nominal hybrid logic.

If a determination is made at operation 82 that the engine start function is available, then the engine is started and the engine stop function is inhibited, as illustrated at block 86. A delay timer is then set, as illustrated at block 88. The delay is a calibratable value that may be, for example, between 0.5 seconds and 1 second. A determination is then made of whether a vehicle acceleration event has ended, as illustrated at operation 90. The end of the acceleration event may be inferred in response to a driver release of an accelerator pedal, a driver actuation of a brake pedal, or based on other appropriate inputs. Generally speaking, the end of the acceleration event is indicative that the driver has completed the driving segment for which it was desired to keep the engine running. If the acceleration event is not over, then the timer is reset at block 88. If the acceleration event is over, then a determination is made of whether the timer has expired, as illustrated at operation 92. If no, control returns to operation 90. In this fashion, the timer acts as a delay to monitor the vehicle acceleration over a calibrated time period and ensure that the acceleration event has ended. Premature vehicle stops caused by transient acceleration changes may thus be avoided. If the timer has expired, then the engine is controlled according the nominal control logic, as illustrated at block 80. The inhibition of the engine stop function is thus ceased.

As may be seen, embodiments of the method described above may also be used in conjunction with other hybrid powertrain configurations. Embodiments may also be used in stop-start vehicles, which are provided with an engine configured to automatically stop and automatically start in response to various operating conditions but are not equipped with a traction motor.

As can be seen from the various embodiments, the present disclosure provides a system and method whereby a driver may ensure that the internal combustion engine will be on to provide torque to vehicle traction wheels when desired. Furthermore, systems and methods according to the present disclosure enable a driver to turn off the engine in driving situations where it is desirable to turn the engine off in deviation from a nominal engine control logic. In addition, control methods according to the present disclosure end automatically at the end of an acceleration or deceleration event, so a vehicle driver does not need to manually re-activate the nominal hybrid control logic.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine; and
   a controller configured to operate the engine
   in a continuous on mode in response to driver input,
   in a stop/start mode in response to an anticipated end of a first vehicle acceleration event following the driver input,
   in a continuous off mode in response to further driver input, and
   in the stop/start mode in response to an anticipated vehicle acceleration event following the further driver input.

2. The vehicle of claim 1, further comprising a vehicle steering wheel paddle, wherein the driver input is received via the paddle.

3. The vehicle of claim 1, wherein the anticipated end of a first vehicle acceleration event is based on a negative change in vehicle acceleration in a forward direction.

4. The vehicle of claim 3, wherein the negative change lasts for a duration exceeding a predefined time interval.

5. The vehicle of claim 1, wherein the anticipated end of a first vehicle acceleration event is based on a change in position of an accelerator pedal or a brake pedal.

6. The vehicle of claim 1, further comprising a display configured to signal a driver that the engine is being operated in the continuous on mode, wherein the controller is further configured to activate the display while operating the engine in the continuous on mode.

7. The vehicle of claim 1, further comprising a display configured to signal to a driver that the start/stop mode is unavailable, wherein the controller is further configured to activate the display and inhibit operating the engine in the start/stop mode in response to presence of a predefined set of operating conditions.

8. A vehicle comprising:
an engine; and
a controller configured to, in response to driver input, the engine being on, and an engine running requirement not being satisfied, automatically stop the engine and maintain the stop until first occurrence of a vehicle acceleration increase, and in response to additional driver input and the engine being off, automatically start the engine and maintain the engine running until first occurrence of a vehicle acceleration decrease.

9. The vehicle of claim 8, wherein the vehicle acceleration decrease corresponds to a release of an accelerator pedal or actuation of a brake pedal.

10. The vehicle of claim 8, wherein the vehicle acceleration increase corresponds to a release of a brake pedal or actuation of an accelerator pedal.

11. The vehicle of claim 8, further comprising a display configured to signal to a driver that the engine may not be stopped, wherein the controller is further configured to activate the display in response to the driver input and the engine running requirement being satisfied.

* * * * *